(12) United States Patent
Chang

(10) Patent No.: US 12,209,621 B2
(45) Date of Patent: Jan. 28, 2025

(54) CONNECTING MEMBER OF A UNIVERSAL CONNECTOR AND THE UNIVERSAL CONNECTOR

(71) Applicant: TRIANGLE INNOVATIVE TOOLS CORPORATION, Taichung (TW)

(72) Inventor: Tung-Jie Chang, Taichung (TW)

(73) Assignee: Triangle Innovative Tools Corporation, Taichung (TW)

( * ) Notice: Subject to any disclaimer, the term of this patent is extended or adjusted under 35 U.S.C. 154(b) by 454 days.

(21) Appl. No.: 17/657,648

(22) Filed: Apr. 1, 2022

(65) Prior Publication Data

US 2023/0313841 A1    Oct. 5, 2023

(51) Int. Cl.
  B25B 23/00    (2006.01)
  F16D 3/10    (2006.01)
  F16D 3/38    (2006.01)

(52) U.S. Cl.
  CPC ............ F16D 3/10 (2013.01); B25B 23/0014 (2013.01); F16D 3/38 (2013.01); *Y10T 403/32041* (2015.01); *Y10T 403/32181* (2015.01); *Y10T 403/32827* (2015.01)

(58) Field of Classification Search
  CPC ......... F16D 3/38; F16D 3/35; B25B 23/0014; Y10T 403/32041; Y10T 403/32181; Y10T 403/32827
  See application file for complete search history.

(56) References Cited

U.S. PATENT DOCUMENTS

| | | | | |
|---|---|---|---|---|
| 2,196,297 | A * | 4/1940 | Gagne | F16D 3/38 464/119 |
| 5,503,491 | A * | 4/1996 | Lu | G06F 1/1616 403/103 |
| 6,656,053 | B2 | 12/2003 | Chang | |
| 6,871,383 | B2 * | 3/2005 | Huang | G06F 1/1681 16/337 |
| 8,500,565 | B2 * | 8/2013 | Billman | F16D 3/382 464/136 |
| 11,739,796 | B2 * | 8/2023 | Tu | F16D 3/38 403/57 |
| 2022/0066420 | A1 * | 3/2022 | Chu | B23P 15/00 |
| 2022/0314406 | A1 * | 10/2022 | Su | B25B 23/0035 |

* cited by examiner

*Primary Examiner* — Michael P Ferguson
(74) *Attorney, Agent, or Firm* — Wang Law Firm, Inc.

(57) ABSTRACT

A connecting member of a universal connector includes a first insertion hole and a second insertion hole formed on from a first end surface toward a second end surface of the connecting member, and a third insertion hole and a fourth insertion hole formed on the second end surface toward the first end surface of the connecting member, whereby the insertion holes will not be affected by and damage other structures of the connecting member in the mechanical process, so as to achieve the enhancement of the convenience of processing.

2 Claims, 6 Drawing Sheets

CONNECTING MEMBER OF A UNIVERSAL CONNECTOR AND THE UNIVERSAL CONNECTOR

BACKGROUND

Field of the Invention

The present invention relates to a universal joint, and more particularly to a universal connector and a connecting member thereof.

Description of Related Art

A universal connector typically includes a first mounting member for being connected to and driven by a driving tool, a second mounting member for connected to and driving a workpiece, an connecting member disposed between the second mounting member and the first mounting member to transmit torque, a first pin inserted into the first mounting member and the connecting member, a second pin inserted into the second mounting member and the connecting member, and restoring members connected to and disposed between the first mounting member and the connecting member and connected to and between the second mounting member and the connecting member, so as to provide a restoring force to two opposite components. The restoring members are hidden between the two components, so that the universal connector is rotatable in any direction when being subjected to an external force, and is restored rapidly to its original position by the restoring members when the external force is gone. However, such a universal connector still has the following disadvantages.

First, difficult mechanical processing. Referring to FIG. 1, which is one of the drawings of the U.S. Pat. No. 6,656,053, since the two ends 111 and 112 of the restoring member 11 must be inserted into the first mounting member 12 (or the second mounting member) and the connecting member 13, respectively, in addition to machining the first mounting member 12 (or the second mounting member) to form an inserting hole 121, it is necessary to machine the connecting member 13 to form an inserting hole 131. However, the inserting hole 131 on the connecting member 13 is too close to the side surface 132A of the accommodating recess 132, and during the drilling process, the drill bit (not shown) must pass along the side surface 132A of the accommodating recess 132, so that the drill bit is easily damaged or destroys the structure of the connecting member 13 during the drilling process. These all lead to the defects of difficult processing.

Second, insufficient structural strength. Referring to FIG. 1, since the connecting member 13 must be formed with a through hole 133 for insertion of the first pin 14, and an inserting groove 131 for insertion of the one end 111 of the restoring member 11, and for preventing the interference occurring in the drilling processing, the position of the inserting groove 131 must be closer to the through hole 133, which causes the very thin thickness of the connecting member 13 between the inserting groove 131 and the through hole 133, thereby adversely affecting the structural strength of the connecting member 13.

SUMMARY

One objective of the present invention is to provide a universal connector and a connecting member thereof, thereby mainly improving the convenience of mechanical processing.

Another objective of the present invention is to provide a universal connector and a connecting member thereof, thereby mainly improving the structural strength.

To achieve the above objectives, the present invention provides a connecting member of a universal connector, and the connecting member includes: a first end surface, a second end surface opposite to the first end surface, a first lateral surface connected to and located between the first end surface and the second end surface, a second lateral surface opposite to the first lateral surface, a third lateral surface connected to and located between the first lateral surface and the second lateral surface, a fourth lateral surface opposite to the third lateral surface, a first accommodating recess recessed from the first lateral surface toward the second lateral surface, a second accommodating recess recessed from the second lateral surface toward the first lateral surface, a third accommodating recess recessed from the third lateral surface toward the fourth lateral surface, a fourth accommodating recess recessed from the fourth lateral surface toward the third lateral surface, a first insertion hole penetrating the first end surface and communicable with the first accommodating recess, a second insertion hole penetrating the first end surface and communicable with the second accommodating recess, a third insertion hole penetrating the second end surface and communicable with the third accommodating recess, and a fourth insertion hole penetrating the second end surface and communicable with the fourth accommodating recess.

The present invention has the following effect. First, enhance the convenience of mechanical processing. Since the first insertion hole and the second insertion hole of the connecting member of the present invention are drilled from the first end surface toward the second end surface, and the third insertion hole and the fourth insertion hole of the connecting member are drilled from the second end surface toward the first end surface, these insertion holes will not be affected by other structures of the connecting member and not damage other structures of the connecting member in the drilling process, so as to achieve the improvement of convenience of mechanical processing. Second, enhance the structural strength. Likewise, the first insertion hole and the second insertion hole are drilled from the first end surface toward the second end surface, and the third insertion hole and the fourth insertion hole are drilled from the second end surface toward the first end surface, the drilling position to each insertion hole can be relatively far away from the corresponding lateral surface, so that the position of each insertion hole and the corresponding lateral surface are a certain distance apart and the connecting member has then a specific thickness between each insertion hole and the corresponding lateral surface, so as to achieve the improvement of structural strength.

Preferably, the first accommodating recess includes a first bottom surface and a first side surface connected to the first bottom surface, and the first insertion hole penetrates the first end surface and the first side surface and is located between the first lateral surface and the first bottom surface.

Preferably, the first insertion hole adjoins the first bottom surface.

Preferably, the second accommodating recess includes a second bottom surface and a second side surface connected to the second bottom surface, and the second insertion hole penetrates the first end surface and the second side surface and is located between the second lateral surface and the second bottom surface.

Preferably, the second insertion hole adjoins the second bottom surface.

Preferably, the third accommodating recess includes a third bottom surface and a third side surface connected to the third bottom surface, and the third insertion hole penetrates the second end surface and the third side surface and is located between the third lateral surface and the third bottom surface.

Preferably, the third insertion hole adjoins the third bottom surface.

Preferably, the fourth accommodating recess includes a fourth bottom surface and a fourth side surface connected to the fourth bottom surface, and the fourth insertion hole penetrates the second end surface and the fourth side surface and is located between the fourth lateral surface and the fourth side surface.

Preferably, the fourth insertion hole adjoins the fourth bottom surface.

To achieve the above objectives, the present invention provides a universal connector, which comprises: a connecting member including: a first end surface, a second end surface opposite to the first end surface, a first lateral surface connected to and located between the first end surface and the second end surface, a second lateral surface opposite to the first lateral surface, a third lateral surface connected to and located between the first lateral surface and the second lateral surface, a fourth lateral surface opposite to the third lateral surface, a first accommodating recess recessed from the first lateral surface toward the second lateral surface, a second accommodating recess recessed from the second lateral surface toward the first lateral surface, a third accommodating recess recessed from the third lateral surface toward the fourth lateral surface, a fourth accommodating recess recessed from the fourth lateral surface toward the third lateral surface, a first insertion hole penetrating the first end surface and communicable with the first accommodating recess, a second insertion hole penetrating the first end surface and communicable with the second accommodating recess, a third insertion hole penetrating the second end surface and communicable with the third accommodating recess, and a fourth insertion hole penetrating the second end surface and the fourth accommodating recess; a first mounting member restorably disposed to one end of the connecting member; a second mounting member restorably disposed to another end of the connecting member; a first restoring member located in the first accommodating recess of the connecting member, and including a first insertion portion to be inserted in the first mounting member, and a second insertion portion to be inserted into the first insertion hole; a second restoring member located in the second accommodating recess of the connecting member, and including a third insertion portion to be inserted in the first mounting member, and a fourth insertion portion to be inserted into the second insertion hole; a third restoring member located in the third accommodating recess of the connecting member, and including a fifth insertion portion to be inserted in the second mounting member, and a sixth insertion portion to be inserted into the third insertion hole; and a fourth restoring member located in the fourth accommodating recess of the connecting member, and including a seventh insertion portion to be inserted in the second mounting member, and an eighth insertion portion to be inserted in the fourth insertion hole.

DETAILED DESCRIPTION

Figure 1:
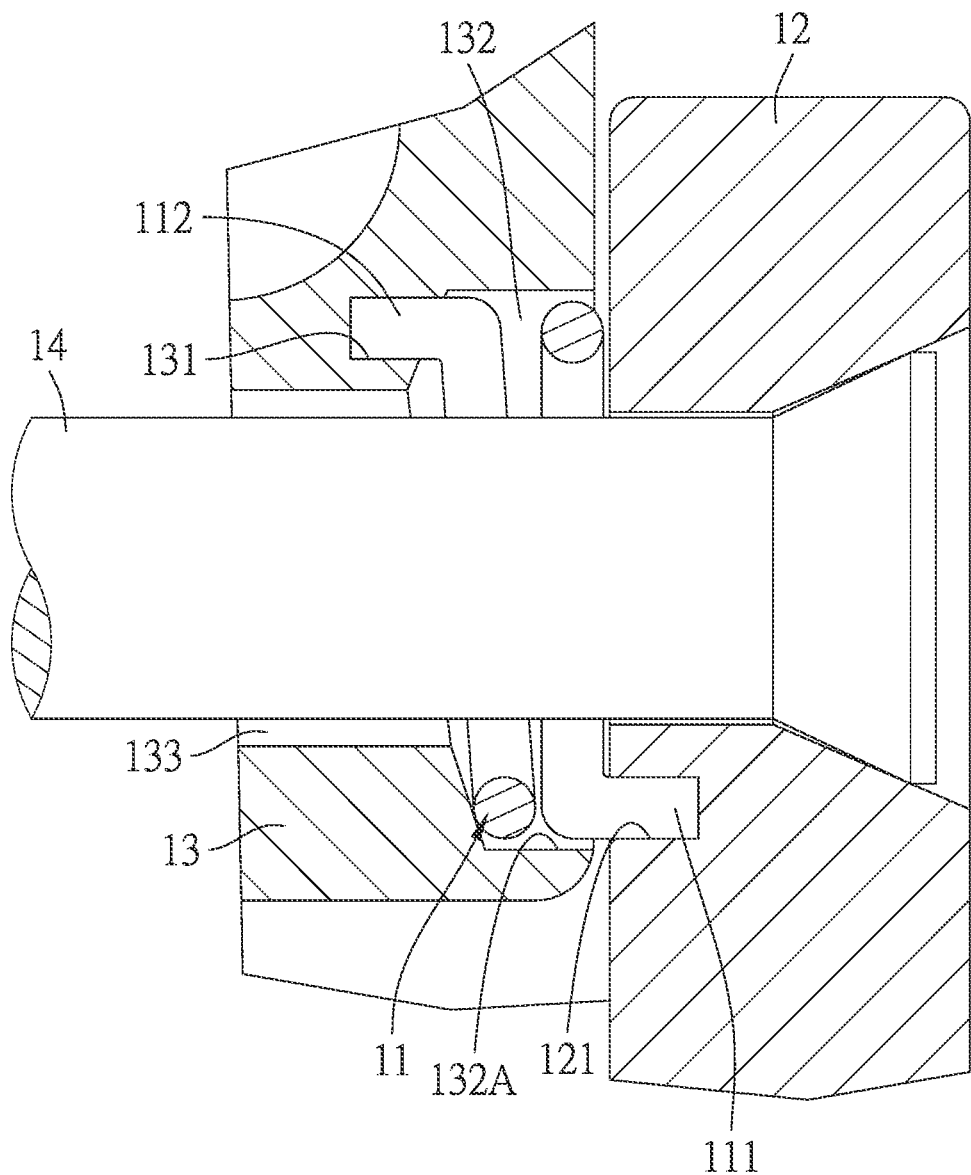
FIG. 1 is one of the drawings in patent No. U.S. Pat. No. 6,656,053.
Figure 2:
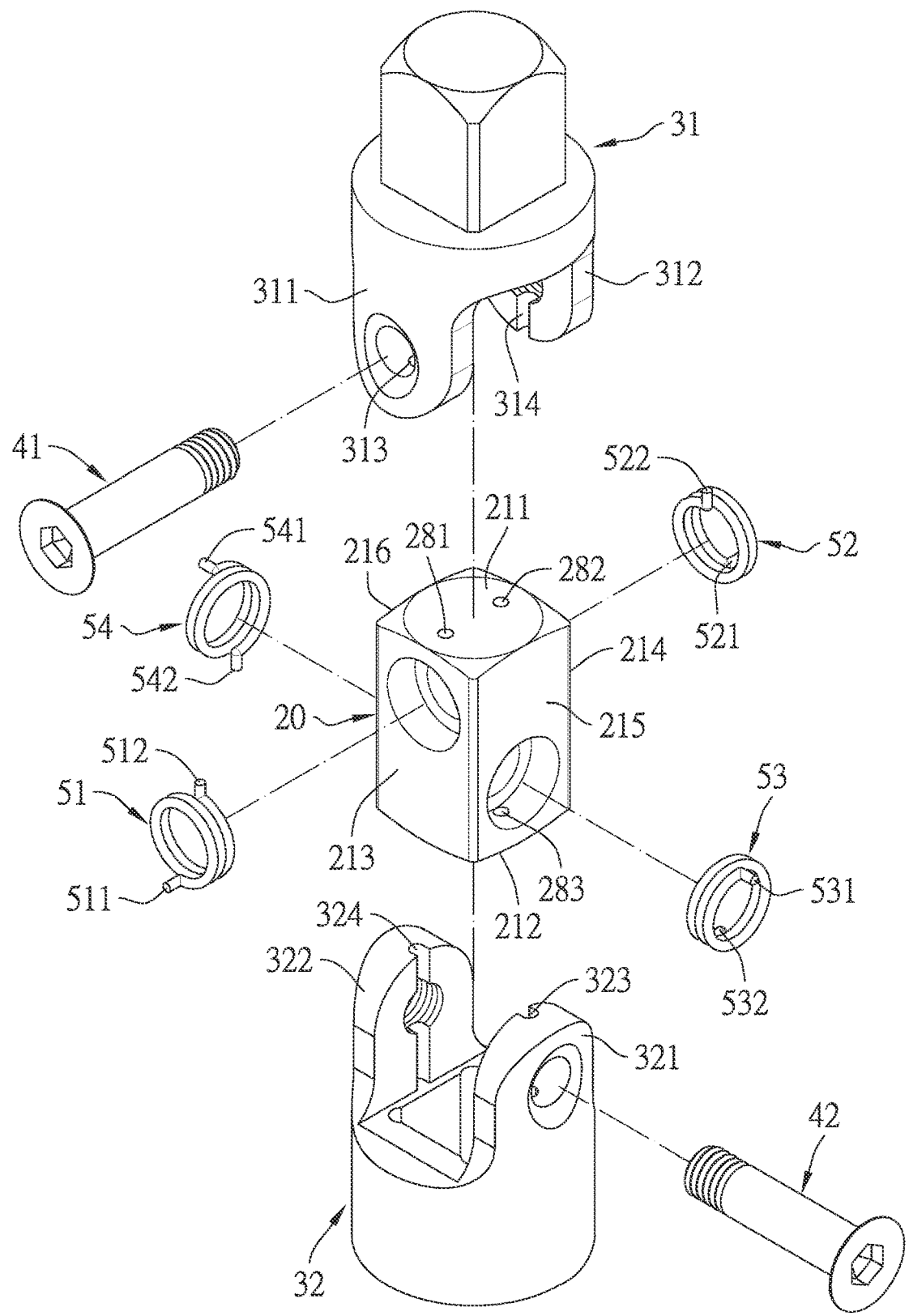
FIG. 2 is an exploded perspective view of an embodiment of the present invention, showing that the connecting member is separated from other components.
Figure 3:
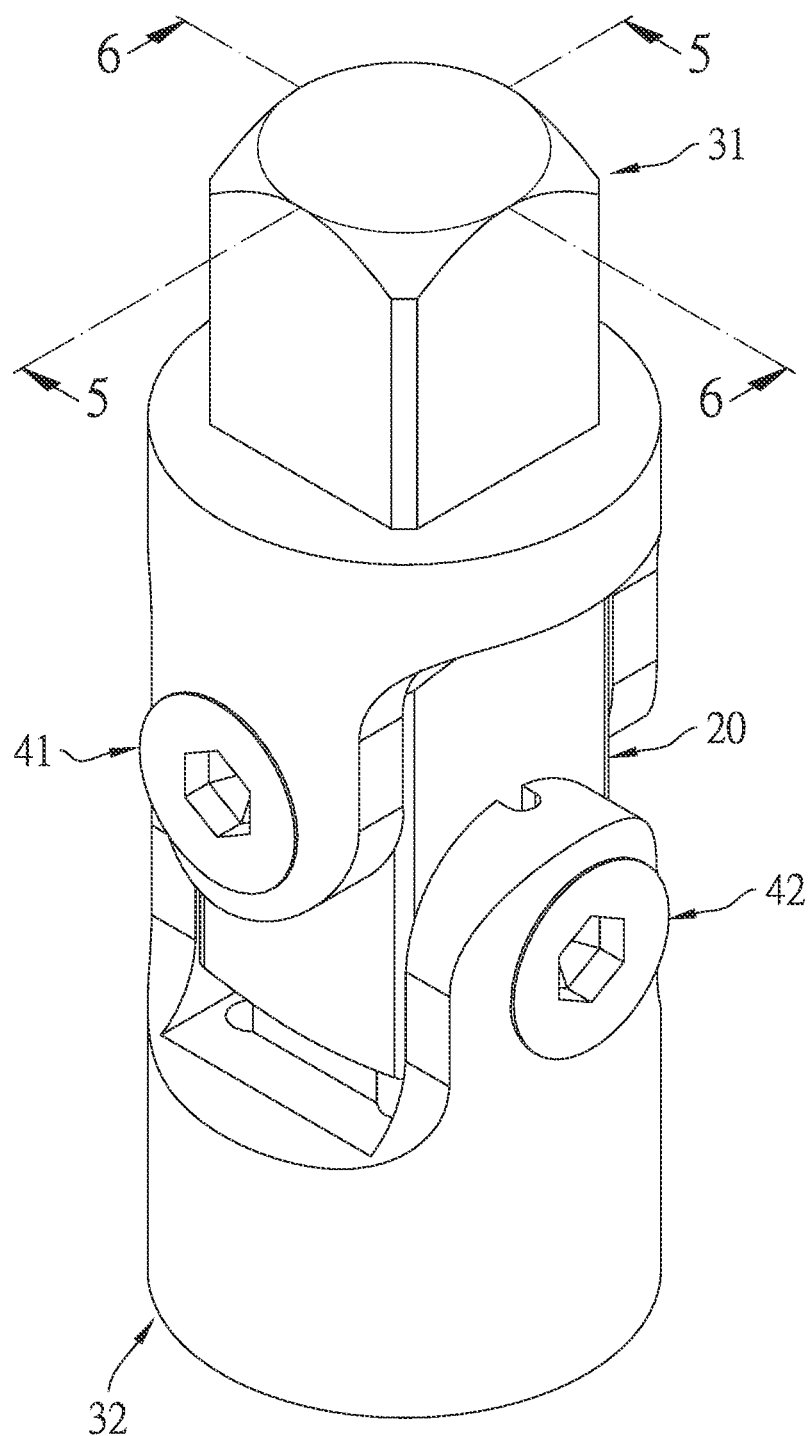
FIG. 3 is a perspective view of an embodiment of the present invention, to show that the connecting member is assembled with other components.
Figure 4:
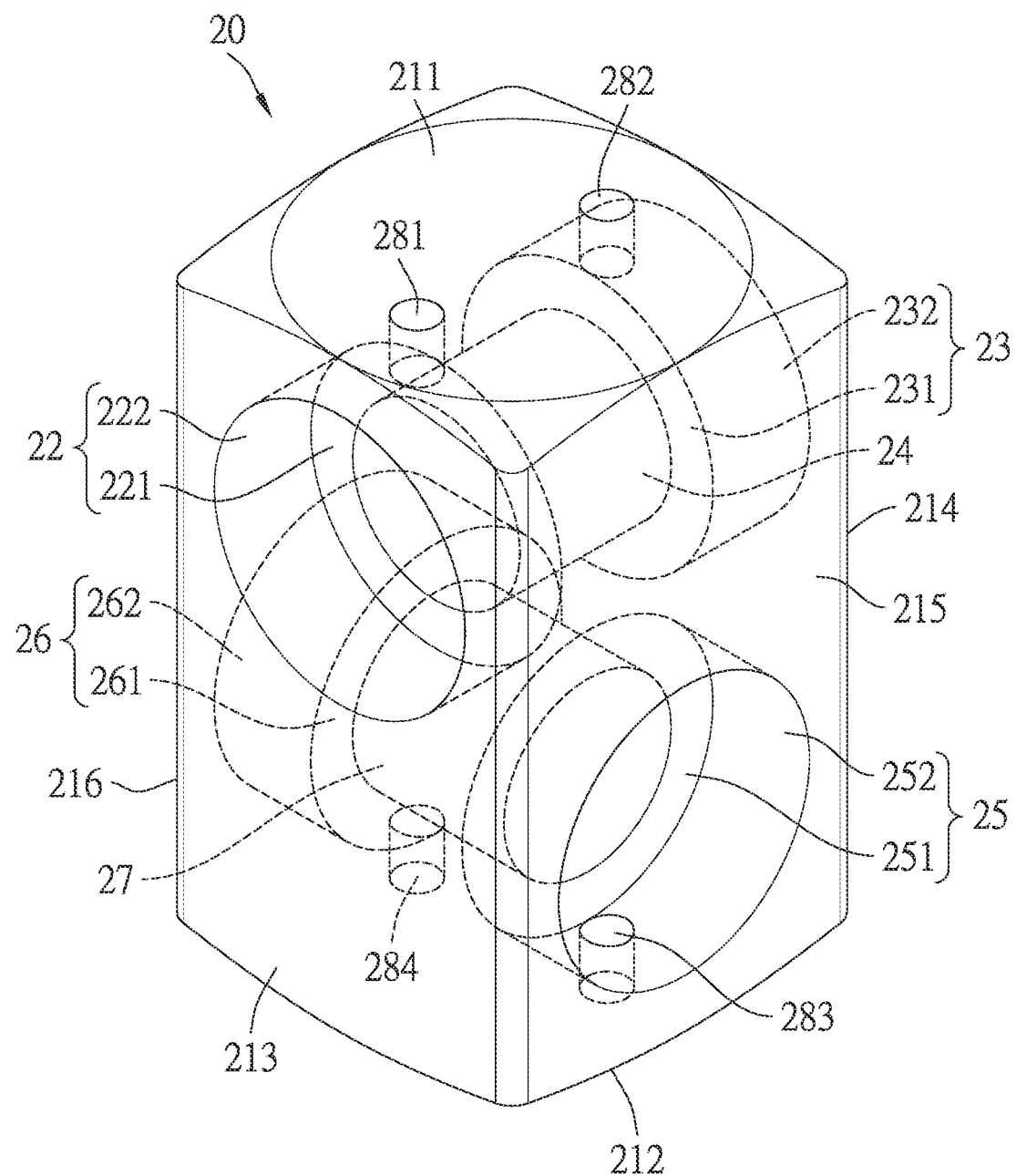
FIG. 4 is a perspective view of a connecting member according to an embodiment of the present invention.

Please refer to FIG. 2 to FIG. 6, a connecting member of a universal connector is provided by an embodiment of the present invention. The connecting member 20, a first mounting member 31, a second mounting member 32, a first pin 41, a second pin 42, a first restoring member 51, a second restoring member 52, a third restoring member 53 and a fourth restoring member 54 are assembled to form a restorable universal connector.

The connecting member 20 includes a first end surface 211, a second end surface 212 opposite to the first end surface 211, a first lateral surface 213 connected to and located between the first end surface 211 and the second end surface 212, a second lateral surface 214 opposite to the first lateral surface 213, a third lateral surface 215 connected to and located between the first lateral surface 213 and the second lateral surface 214, a fourth lateral surface 216 opposite to the third lateral surface 215, a first accommodating recess 22 recessed from the first lateral surface 213 toward the second lateral surface 214, a second accommodating recess 23 recessed from the second lateral surface 214 toward the first lateral surface 213, a first through hole 24 communicable with and located between the first accommodating recess 22 and the second accommodating recess 23, a third accommodating recess 25 recessed from the third lateral surface 215 toward the fourth lateral surface 216, a fourth accommodating recess 26 recessed from the fourth lateral surface 216 toward the third lateral surface 215, a second through hole 27 communicable with and located between the third accommodating recess 25 and the fourth accommodating recess 26, a first insertion hole 281 penetrating the first end surface 211 and communicable with the first accommodating recess 22, a second insertion hole 282 penetrating the first end surface 211 and communicable with the second accommodating recess 23, a third insertion hole 283 penetrating the second end surface 212 and communicable with the third accommodating recess 25, and a fourth insertion hole 284 penetrating the second end surface 212 and communicable with the fourth accommodating recess 26.

Figure 5:
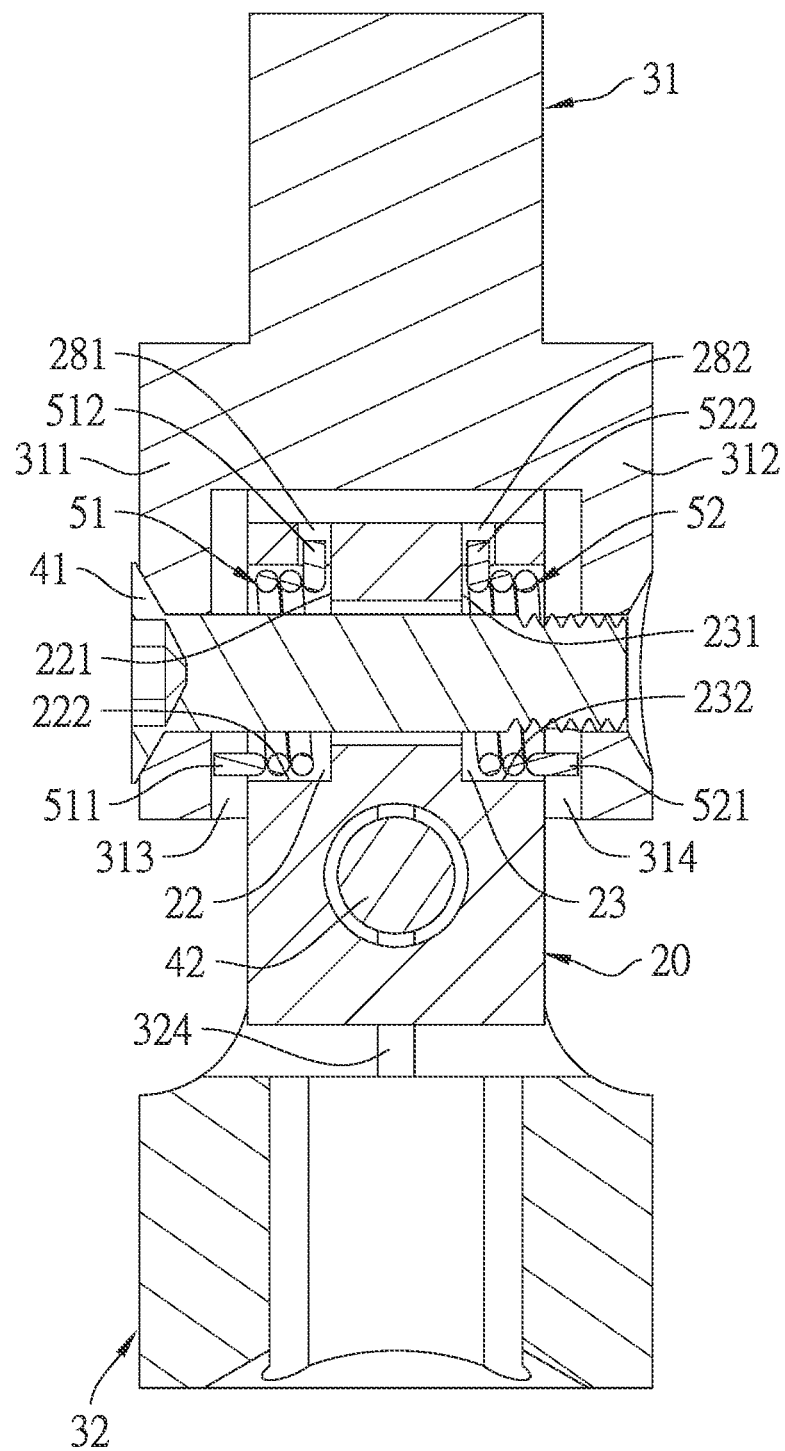
FIG. 5 is a cross-sectional view taken along the line 5-5 of FIG. 3.
Figure 6:
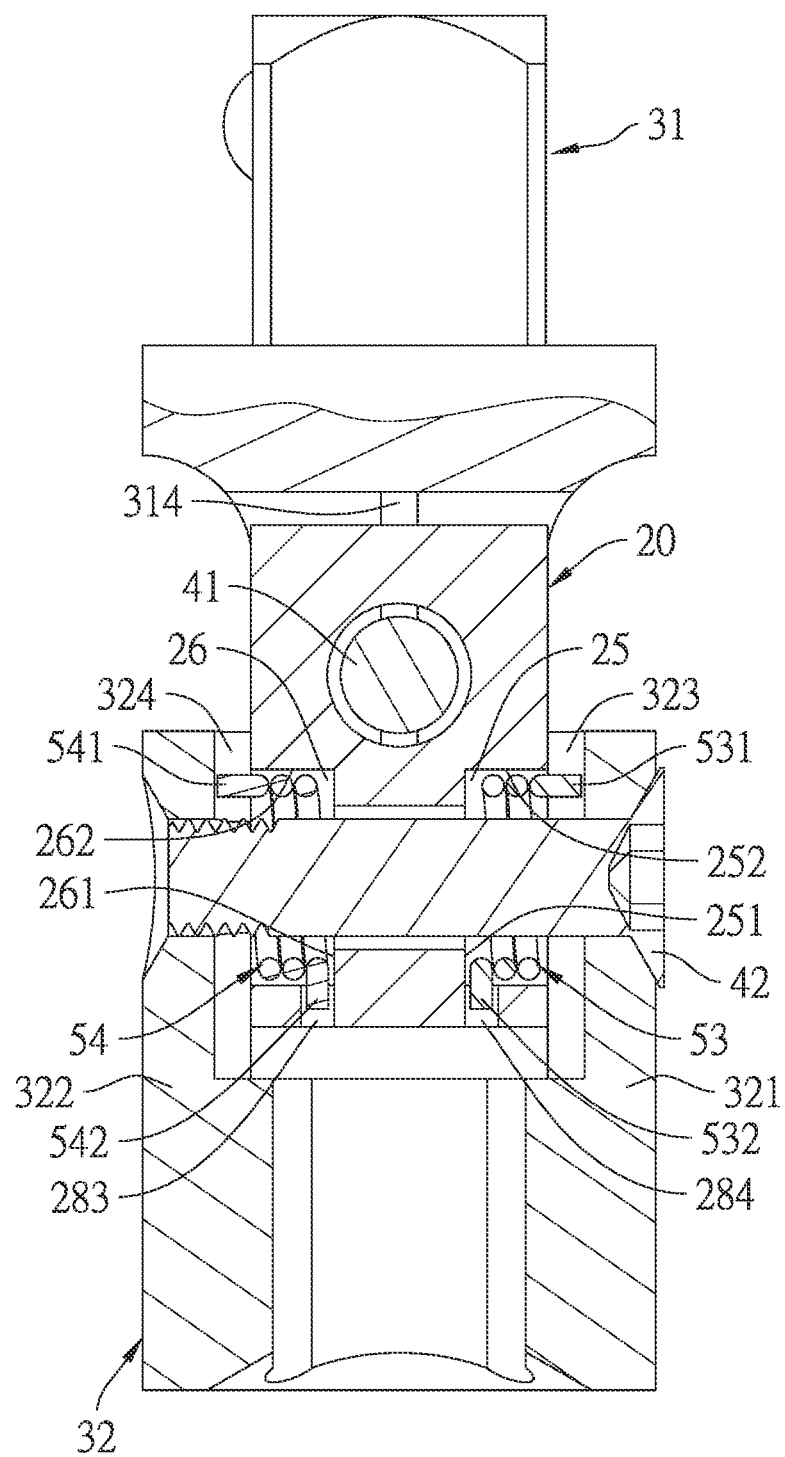
FIG. 6 is a cross-sectional view taken along the line 6-6 of FIG. 3.

In this embodiment, the first accommodating recess 22 includes a first bottom surface 221 and a first side surface 222 connected to the first bottom surface 221, the first insertion hole 281 penetrates the first end surface 211 and the first side surface 222 and is located between the first lateral surface 213 and the first bottom surface 221, and the first insertion hole 281 adjoins the first bottom surface 221 (i.e. the inner surface of the first insertion hole 281 adjoining the first bottom surface 221 is aligned with the first bottom surface 221 so that this part of the inner surface of the first insertion hole 281 and the first bottom surface 221 together form a flat surface, as shown in FIG. 5); the second accommodating recess 23 includes a second bottom surface 231 and a second side surface 232 connected to the second bottom surface 231, the second insertion hole 282 penetrates the first end surface 211 and the second side surface 232 and is located between the second lateral surface 214 and the second bottom surface 231, and the second insertion hole 282 adjoins the second bottom surface 231; the third accommodating recess 25 includes a third bottom surface 251 and a third side surface 252 connected to the third bottom surface 251, the third insertion hole 283 penetrates the second end surface 212 and the third side surface 252 and is located between the third lateral surface 215 and the third bottom surface 251, and the third insertion hole 283 adjoins the third bottom surface 251; and the fourth accommodating recess 26 includes a fourth bottom surface 261 and a fourth side surface 262 connected to the fourth bottom surface 261, the fourth insertion hole 284 penetrates the second end surface 212 and the fourth side surface 262 and is located between the fourth lateral surface 216 and the fourth side surface 262, and the fourth insertion hole 284 adjoins the fourth bottom surface 261.

The first mounting member 31 is restorably disposed to one end of the connecting member 20, and includes: a first pivot portion 311 located at the first lateral surface 213, a second pivot portion 312 located at the second lateral surface 214, a first limiting groove 313 located on the first pivot portion 311, and a second limiting groove 314 located on the second pivot portion 312.

The second mounting member 32 is restorably disposed to another end of the connecting member 20, and includes: a third pivot portion 321 located at the third lateral surface 215, and a fourth pivot portion 322 located at the fourth lateral surface 216, a third limiting groove 323 located on the third pivot portion 321, and a fourth limiting groove 324 located on the fourth pivot portion 322.

The first pin 41 is inserted in the first pivot portion 311 and the second pivot portion 312 of the first mounting member 31 and in the first through hole 24 of the connecting member 20.

The second pin 42 is inserted in the third pivot portion 321 and the fourth pivot portion 322 of the second mounting member 32 and in the second through hole 27 of the connecting member 20.

The first restoring member 51 is a torsion spring, which is sleeved on the first pin 41 and located in the first accommodating recess 22 of the connecting member 20. The first restoring member 51 includes a first insertion portion 511 to be inserted into the first limiting groove 313, and a second insertion portion 512 to be inserted into the first insertion hole 281.

The second restoring member 52 is a torsion spring, which is sleeved on the first pin 41 and located in the second accommodating recess 23 of the connecting member 20. The second restoring member 52 includes a third insertion portion 521 to be inserted in the second limiting groove 314, and a fourth insertion portion 522 to be inserted into the second insertion hole 282.

The third restoring member 53 is a torsion spring, which is sleeved on the second pin 42 and located in the third accommodating recess 25 of the connecting member 20. The third restoring member 53 includes a fifth insertion portion 531 to be inserted in the third limiting groove 323, and a sixth insertion portion 532 to be inserted into the third insertion hole 283.

The fourth restoring member 54 is a torsion spring, which is sleeved on the second pin 42 and located in the fourth accommodating recess 26 of the connecting member 20. The fourth restoring member 54 includes a seventh insertion portion 541 to be inserted in the fourth limiting groove 324, and an eighth insertion portion 542 to be inserted in the fourth insertion hole 284.

As set forth above, the configuration of respective main components of the embodiment of the present invention is described, and the effect(s) of the present invention is described as follows.

First, enhance the convenience of mechanical processing. Since the first insertion hole 281 and the second insertion hole 282 of the connecting member 20 of the present invention are drilled from the first end surface 211 toward the second end surface 212, and the third insertion hole 283 and the fourth insertion hole 284 of the connecting member 20 are drilled from the second end surface 212 toward the first end surface 211, the insertion holes will not be affected by other structures of the connecting member 20 and not damage other structures of the connecting member in the drilling process, so as to achieve the improvement of convenience of processing.

Second, strengthen the structural strength. Likewise, the first insertion hole 281 and the second insertion hole 282 are drilled from the first end surface 211 toward the second end surface 212, and the third insertion hole 283 and the fourth insertion hole 284 are drilled from the second end surface 212 toward the first end surface 211, so that the drilling position to each insertion hole can be relatively far away from the corresponding lateral surface, and the position of each insertion hole and the corresponding lateral surface are a specific distance apart, whereby the connecting member 20 has a sufficient thickness between each insertion hole and the corresponding lateral surface, so as to achieve the improvement of structural strength.

It should be noted that the forming position of the first insertion hole 281 of the connecting member 20 is not limited to being adjacent to the first bottom surface 221, but can be changed to be located between the first lateral surface 213 and the first bottom surface 221 as long as the structural strength is sufficient. Of course, the closer the first insertion hole 281 is to the first bottom surface 221, the farther it is from the first lateral surface 213, leading to the stronger structural strength. Similarly, the forming position of the second insertion hole 282 of the connecting member 20 is not limited to being adjacent to the second bottom surface 231, but can be changed to be located between the second lateral surface 214 and the second bottom surface 231 as long as the structural strength is sufficient. Of course, the closer the second insertion hole 282 is to the second bottom surface 231, the farther it is from the second lateral surface 214, leading to the stronger structural strength. Similarly, the forming position of the third insertion hole 283 of the connecting member 20 is not limited to being adjacent to the third bottom surface 251, but can be changed to be located between the third lateral surface 215 and the third bottom surface 251, as long as the structural strength is sufficient. Of course, the closer the third insertion hole 283 is to the third bottom surface 251, the farther it is from the third lateral surface 215, leading to the stronger structural strength. Similarly, the forming position of the fourth insertion hole 284 of the connecting member 20 is not limited to being adjacent to the fourth bottom surface 261, but can be changed to be located between the fourth lateral surface 216 and the fourth bottom surface 261 as long as the structural strength is sufficient. Of course, the closer the fourth insertion hole 284 is to the fourth bottom surface 261, the farther it is from the fourth lateral surface 216, leading to the stronger structural strength.

What is claimed is:

1. A universal connector comprising:

a connecting member including: a first end surface, a second end surface opposite to the first end surface, a first lateral surface connected to and located between the first end surface and the second end surface, a second lateral surface opposite to the first lateral surface, a third lateral surface connected to and located between the first lateral surface and the second lateral surface, a fourth lateral surface opposite to the third lateral surface, a first accommodating recess recessed from the first lateral surface toward the second lateral surface, a second accommodating recess recessed from the second lateral surface toward the first lateral surface, a third accommodating recess recessed from the third lateral surface toward the fourth lateral surface, a fourth accommodating recess recessed from the fourth lateral surface toward the third lateral surface, a first insertion hole penetrating the first end surface and communicable with the first accommodating recess, a second insertion hole penetrating the first end surface and communicable with the second accommodating recess, a third insertion hole penetrating the second end surface and communicable with the third accommodating recess, and a fourth insertion hole penetrating the second end surface and communicable with the fourth accommodating recess;

a first mounting member restorably disposed to one end of the connecting member;

a second mounting member restorably disposed to another end of the connecting member;

a first restoring member located in the first accommodating recess of the connecting member, and including a first insertion portion to be inserted in the first mounting member, and a second insertion portion to be inserted into the first insertion hole;

a second restoring member located in the second accommodating recess of the connecting member, and including a third insertion portion to be inserted in the first mounting member, and a fourth insertion portion to be inserted into the second insertion hole;

a third restoring member located in the third accommodating recess of the connecting member, and including a fifth insertion portion to be inserted in the second mounting member, and a sixth insertion portion to be inserted into the third insertion hole; and a fourth restoring member located in the fourth accommodating recess of the connecting member, and including a seventh insertion portion to be inserted in the second mounting member, and an eighth insertion portion to be inserted in the fourth insertion hole;

the first accommodating recess includes a first bottom surface and a first side surface connected to the first bottom surface, the first insertion hole penetrates the first end surface and the first side surface and is located between the first lateral surface and the first bottom surface, and the first insertion hole adjoins the first bottom surface;

the second accommodating recess includes a second bottom surface and a second side surface connected to the second bottom surface, the second insertion hole penetrates the first end surface and the second side surface and is located between the second lateral surface and the second bottom surface, and the second insertion hole adjoins the second bottom surface;

the third accommodating recess includes a third bottom surface and a third side surface connected to the third bottom surface, the third insertion hole penetrates the second end surface and the third side surface and is located between the third lateral surface and the third bottom surface, and the third insertion hole adjoins the third bottom surface;

the fourth accommodating recess includes a fourth bottom surface and a fourth side surface connected to the fourth bottom surface, the fourth insertion hole penetrates the second end surface and the fourth side surface and is located between the fourth lateral surface and the fourth side surface, and the fourth insertion hole adjoins the fourth bottom surface.

2. The universal connector as claimed in claim 1, wherein the connecting member comprises a first through hole communicable with and located between the first accommodating recess and the second accommodating recess, and a second through hole communicable with and located between the third accommodating recess and the fourth accommodating recess, the universal connector further comprises a first pin and a second pin, the first pin is inserted in a first pivot portion and a second pivot portion of the first mounting member and the first through hole of the connecting member, and the second pin is inserted in a third pivot portion and a fourth pivot portion of the second mounting member and the second through hole of the connecting member.

* * * * *